Aug. 2, 1938.  D. P. HYNES  2,125,569
HOOD
Filed March 12, 1936  2 Sheets-Sheet 1
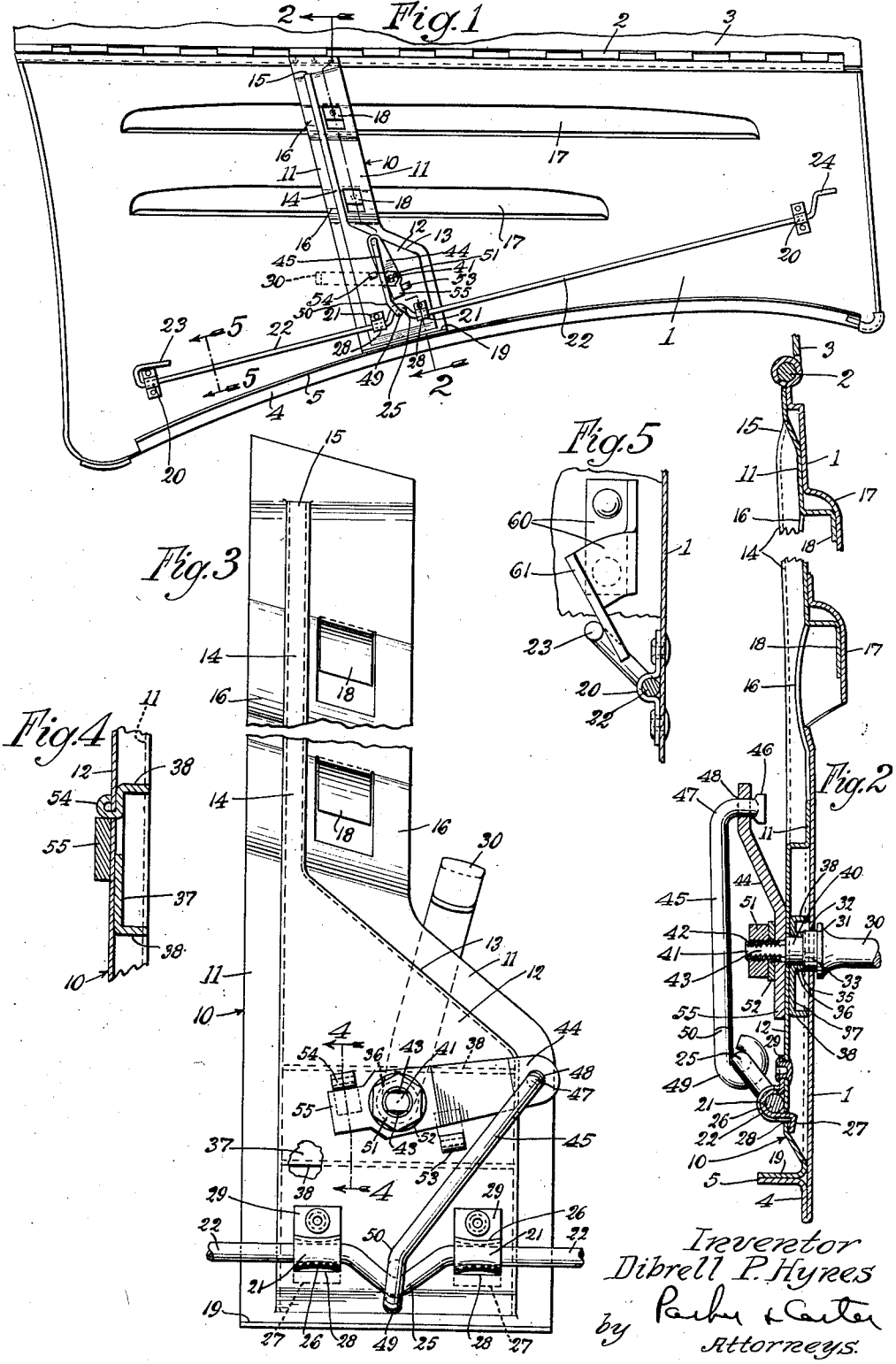
Inventor
Dibrell P. Hynes
by Parker & Carter
Attorneys.

Aug. 2, 1938.　　　D. P. HYNES　　　2,125,569
HOOD
Filed March 12, 1936　　　2 Sheets-Sheet 2
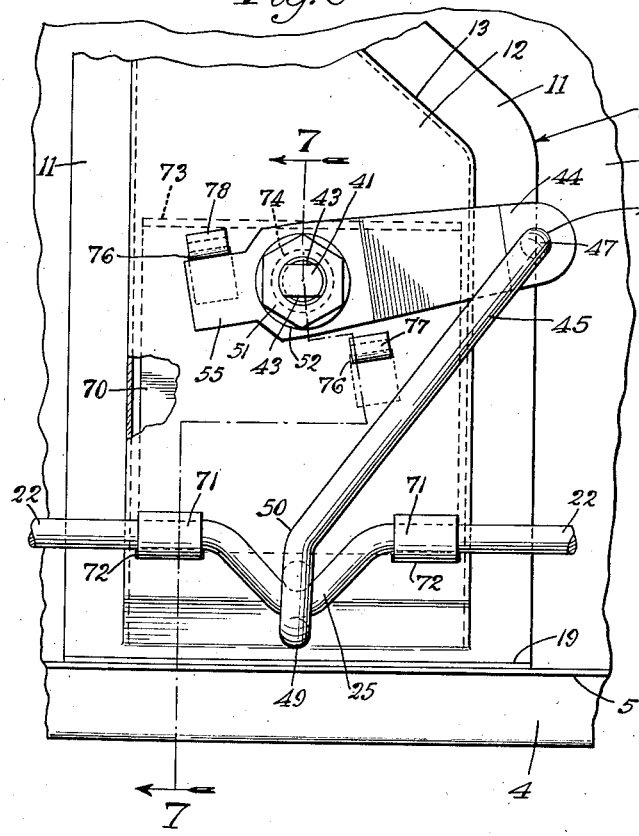
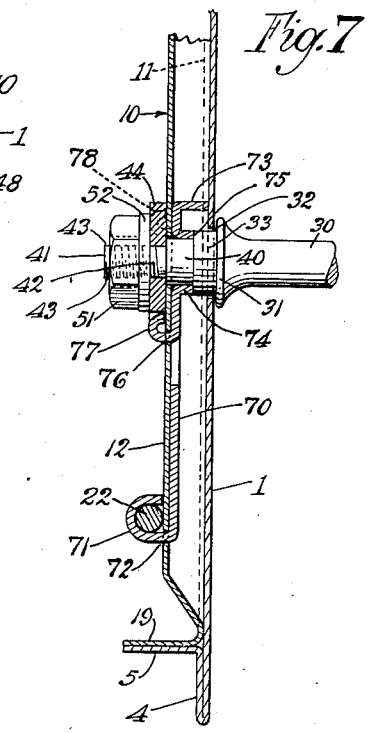
Inventor
Dibrell P. Hynes
by Parker & Carter
Attorneys.

Patented Aug. 2, 1938

2,125,569

UNITED STATES PATENT OFFICE 2,125,569

HOOD

Dibrell P. Hynes, Evanston, Ill., assignor to Chicago Forging & Manufacturing Co., Chicago, Ill., a corporation of Illinois Application March 12, 1936, Serial No. 68,431

7 Claims. (Cl. 180—69)

My invention relates to an improvement in automobile hood latches and has for one purpose the provision of the improved latch for drawing downwardly and inwardly a lower edge of the multiple hinged automobile hood closure. Another object is the provision of improved means for positioning or supporting such a latch upon the hood closure. Another object is the provision of improved means for reinforcing said closure in connection with the operation or support of the hood latch. Other objects will appear from time to time in the course of the specification and claims.

I illustrate my invention more or less diagrammatically in the accompanying drawings, wherein—

Figure 1 is an inside view of an automobile hood closure with the structure of my invention in position therein;

Figure 2 is an enlarged scale section taken on the line 2—2 of Figure 1;

Figure 3 is an enlarged view of part of the structure shown in Figure 1, with the parts in a different position;

Figure 4 is a section on the line 4—4 of Figure 3;

Figure 5 is a section through section line 5—5 of Figure 1, illustrating the action of the latch against the keeper;

Figure 6 is a view, similar to Figure 3, of a variant form of the device; and

Figure 7 is a section on the line 7—7 of Figure 6.

Like parts are indicated by like symbols throughout the specification and drawings.

Referring to the drawings, 1 generally indicates the multiple hinged section of an automobile hood closure. The hinge structure is shown, for example, at 2, and 3 indicates a portion of the hood closure to which the portion 1 is hinged. The bottom of the hood closure 1 is herein shown as sharply upwardly turned or bent, as at 4 with a laterally extending flange 5, serving as a reinforcement for the lower edge of the member 1, permitting it to be made of relatively thin gauge sheet stock. It will be understood that the closure 1 abuts at its ends and lower edge against the opposed portions of the automobile, the radiator at the front end, and the cowl at the rear, these parts on it being herein not illustrated.

10 generally illustrates a reinforcing structure which includes, for example, surrounding flat flange portions 11 which may be welded or otherwise secured to the opposed inner face of the member 1. 12 indicates a central raised portion inwardly spaced from the inner face of the member 1 as shown, for example, in Figure 2. It is herein shown as a substantially extended or as tapering upwardly, as at 13, and continuous with an upwardly extending and elongated reinforcing offset or rib 14, which lies in the same general plane. The members of 11 and 14 are herein shown as converging as at 15, terminating adjacent the hinge structure. The flange 11 may, if desired, be somewhat inwardly curved or arched as at 16 in alignment with the horizontal louvres 17. Two of the said louvres are shown, and, since they have a substantial longitudinal extension, a strengthening means is of substantial utility. I may also employ offset flanges or angles 18, which may be punched out of the flange 11, and which may be secured to the inner faces of said louvres 17, as shown, for example, in Figure 2. An additional flange 19, formed on the lower portion of the structure 10 may be welded to the flange 5 of the hood closure 1.

Mounted in bearings 20 at each end and in addition to intermediate bearing portions 21 on the lower portion of the member 12 is a rock shaft 22. This rock shaft is provided at its ends with offset or bent crank portions 23, 24 which may be of any suitable type or shape. 25 indicates an intermediate crank offset of the rock shaft 22, which lies between the bearings 21. The bearings 21 are indicated as mounted for ready removal from the member 12. They include, for example, the arched central potions 26 and flange 27 adapted to penetrate through the aperture 28 in the member 12 and the flange 29 adapted to be riveted to the face of the member 12 by a rivet which can readily be punched out. It will be understood that when the parts are in the position in which they are shown in Figure 2 a center rivet for each bearing 21 holds it in position about the rock shaft 22.

30 indicates any suitable outside handle rotatable about an axis generally perpendicular to the face of the closure 1. It includes an outwardly extending boss or flange 31 adapted to mask an aperture 32 through which passes a cylindrical portion 33 of the handle. This cylindrical portion abuts against the edge 35 of the cylindrical inner flange 36 which is connected by a plate 37 with outer parallel flanges 38. The structure so described fits snugly between the opposed faces of the members 1 and 12, and serves as a further strengthening reinforcement and as a support for the said bearing structure. The portion 33 of the handle terminates in a reduced cylindrical portion 40 which rotates in the cylindrical bearing formed by the inner face of the flange 36. 41 is a still further reduced portion of the handle screw threaded as at 42 and flattened as at 43. It receives the crank 44, relative rotation of the members 41 and 44 being prevented by the said flattened portions 43. 45 is a connecting link headed as at 46 and crooked as at 47. The headed portion passes through an aperture 48 in the end of the crank 44. At the opposite end is a hook or loop 49, angularly bent as at 50, and surrounding the offset crank portion 25 of the rock shaft 22. 51 indicates any suitable nut, and 52 a spring washer or lock washer whereby the handle assembly is locked together in position.

53 and 54 are limit projections, which may be upsets from the member 37 projecting through the raised portion 12 for engagement with a heel 55 of the crank 44, whereby to limit the rotation of said crank to a predetermined arc.

Referring to Figure 5, 60 indicates any suitable brackets or keepers which may include inclined face members 61, adapted to receive the cranks 23 or 24 of the rock shaft 22, in locking relationship. They are so formed and positioned that, when the rock shaft 22 is rotated by the handle into locking position, the torque of the rod, and the thrust of the cranks 23 and 24 against the inclined surfaces 61, draws the lower edge of the closure 1 downwardly and inwardly in a tight and rattleproof relationship with the adjacent portions of the automobile.

It will be realized that, when the parts are in the position in Figure 1, which is the locking position, the crank 44 is over center and the wheel 55 is held, by the torque of the shaft 22, against the abutment 54.

Referring to the variant form of Figures 6 and 7, I illustrate as interposed between the hood 1 and the base member 12, a combined spacing and bearing member generally indicated as 70. It includes two ears or bearing flanges 71, extending through apertures 72 in the member 12 and recurved in such fashion as to provide bearings for the rod 22 on each side of the central crank portion 25. These bearings take the place of the separate bearing members indicated as at 21 in Figures 2 and 3. The member 12 is also provided with a spacing flange, extending transversely across the member 12, and indicated at 73. Adjacent it is a bearing sleeve member 74 the edge of which, 75, abuts against a portion 33 of the handle. Struck up from the member 70, and extending through apertures 76 in the member 12 are additional ears or lugs 77, 78, which serve as terminal abutments for engagement with the portion 55 of the crank 44, whereby to limit its arc of rotation. In the form herein shown the arc is about 90 degrees.

I claim:

1. In combination, a generally horizontally hinged automobile hood closure having a plurality of longitudinally extending louvres and a portion free from louvres adjacent the lower edge of the closure, a brace secured to the inner face of said closure and bridging said louvres, said brace including a widened portion opposed to the inner face of the louvre-free portion of said closure.

2. In combination, a generally horizontally hinged automobile hood closure having a plurality of longitudinally extending louvres and a portion free from louvres adjacent the lower edge of the closure, and a brace secured to the inner face of said closure and bridging said louvres, said brace including a widened portion opposed to the inner face of the louvre-free portion of said closure and spaced inwardly away from said inner face.

3. In combination, a generally horizontally hinged automobile hood closure having a plurality of longitudinally extending louvres and a portion free from louvres adjacent the lower edge of the closure, a brace secured to the inner face of said closure and bridging said louvres, said brace including a widened portion opposed to the inner face of the louvre-free portion of said closure and spaced inwardly away from said inner face, and a reinforcing member located in the space between said widened portion and said inner face.

4. In combination, a generally horizontally hinged automobile hood closure having a plurality of longitudinally extending louvres and a portion free from louvres adjacent the lower edge of the closure, a brace secured to the inner face of said closure and bridging said louvres, said brace including a widened portion opposed to the inner face of the louvre-free portion of said closure and spaced inwardly away from said inner face, and a reinforcing member located in the space between said widened portion and said inner face, said reinforcing member being formed with a bearing sleeve, said brace and closure being apertured in alinement with said sleeve.

5. In combination, a generally horizontally hinged automobile hood closure having a plurality of longitudinally extending louvres and a portion free from louvres adjacent the lower edge of the closure, and a brace secured to the inner face of said closure and bridging said louvres, said brace including a widened portion opposed to the inner face of the louvre-free portion of said closure and portions extending into said louvres.

6. In combination, a generally horizontally hinged automobile hood closure having a plurality of longitudinally extending louvres and a portion free from louvres adjacent the lower edge of the closure, and a brace secured to the inner face of said closure and bridging said louvres, said brace including a widened portion opposed to the inner face of the louvre-free portion of said closure, said brace extending from the hinge to the lower edge of the closure.

7. In combination, a generally horizontally hinged automobile hood closure having a plurality of longitudinally extending louvres and a portion free from louvres adjacent the lower edge of the closure, and a brace secured to the inner face of said closure and bridging said louvres, said brace including a widened portion opposed to the inner face of the louvre-free portion of said closure, said brace extending from the hinge to the lower edge of the closure, the opposed edges of closure and brace having opposed inwardly extending flanges.

DIBRELL P. HYNES.